(12) United States Patent
Tamarkin et al.

(10) Patent No.: US 7,558,640 B2
(45) Date of Patent: Jul. 7, 2009

(54) ABSTRACT PRODUCT DESCRIPTION SYSTEM AND METHOD

(75) Inventors: Noam Tamarkin, Herzliya (IL); Yuval Morad, Bnei Brak (IL); Tami Amir, Tel-Aviv (IL); Ami Heitner, Kfar-Sava (IL)

(73) Assignee: SAP AG, Walldorf (DE)

( * ) Notice: Subject to any disclaimer, the term of this patent is extended or adjusted under 35 U.S.C. 154(b) by 336 days.

(21) Appl. No.: 11/321,202

(22) Filed: Dec. 29, 2005

(65) Prior Publication Data

US 2007/0156254 A1 Jul. 5, 2007

(51) Int. Cl.
G06F 19/00 (2006.01)
(52) U.S. Cl. ............ 700/103; 700/13; 700/101; 700/214; 705/28
(58) Field of Classification Search .......... 700/13, 700/99, 100, 101, 102, 103, 213, 214; 705/28
See application file for complete search history.

(56) References Cited

U.S. PATENT DOCUMENTS

| | | | |
|---|---|---|---|
| 5,450,317 A | | 9/1995 | Lu et al. |
| 5,936,860 A | * | 8/1999 | Arnold et al. ............ 700/95 |
| 6,744,436 B1 | | 6/2004 | Chirieleison, Jr. et al. |
| 6,789,252 B1 | | 9/2004 | Burke et al. |
| 6,974,928 B2 | | 12/2005 | Bloom |
| 7,058,596 B1 | * | 6/2006 | Wojcik et al. ............ 705/26 |
| 2003/0093178 A1 | * | 5/2003 | Russell et al. ............ 700/217 |

* cited by examiner

*Primary Examiner*—Kidest Bahta
*Assistant Examiner*—Nathan Laughlin
(74) *Attorney, Agent, or Firm*—Fish & Richardson P.C.

(57) ABSTRACT

The present invention relates to abstract product descriptions and methods. In a first general aspect, a method comprises a computer program product tangibly embodied in an information carrier, the computer program product including instructions that, when executed, perform operations for configuring a logistic unit for planning and processing in a logistic environment. The method may comprise accessing a template database object that may be compatible with a modeled logistic environment process, and receiving a user assignment of defined attributes for the accessed template object. The defined attributes may describe a feature common to multiple different physical receptacles used to contain stock in a logistic environment or a feature common to contents of the receptacles. The generated logistic unit may be based on the template database object and the defined attributes, wherein the logistic unit is assignable to a stock item to define how the stock item is to be handled in the modeled logistic environment process.

17 Claims, 6 Drawing Sheets

ABSTRACT PRODUCT DESCRIPTION SYSTEM AND METHOD

TECHNICAL FIELD

This invention relates to an abstract product description system and method.

BACKGROUND

Logistic environments may include warehouses, production facilities, supermarkets and similar entities where stock may be moved, stored, or produced. Business enterprises managing these logistic environments may strive to develop appropriate logistic processes to achieve maximum efficiency in day-to-day operations. In current software solutions, logistic environment operations, such as moving, packing, or checking, may be associated with a Global Trade Identification Number (GTIN), or a stock identification number (STID), which may have specific product information tied to that identifier.

In current software solutions that manage the movement of stock in a logistic environment, there may be software functions that process each product based on the product's GTIN or STID. Because each product may require its own processing method, the complexity of the software solution may be increased and the flexibility of the solution may be decreased. Additionally, the complexity and amount of code related to processing products may make the software product difficult to maintain and learn by customers.

SUMMARY

The present invention relates to abstract product descriptions and methods. In a first general aspect a method comprises a computer program product tangibly embodied in an information carrier, the computer program product including instructions that, when executed, perform operations for configuring a logistic unit for planning and processing in a logistic environment. The method may comprise accessing a template database object that may be compatible with a modeled logistic environment process, and receiving a user assignment of defined attributes for the accessed template object. The defined attributes may describe a feature common to multiple different physical receptacles used to contain stock in a logistic environment or a feature common to contents of the receptacles. The generated logistic unit may be based on the template database object and the defined attributes, wherein the logistic unit is assignable to a stock item to define how the stock item is to be handled in the modeled logistic environment process.

In a second general aspect, the method comprises a computer program product tangibly embodied in an information carrier, the computer program product including instructions that, when executed, perform operations for associating logistic units with receptacles or stock items. An electronic document may be received that specifies a logistic environment process to be performed on a stock item or a physical receptacle used to contain the stock item, wherein the stock item and receptacle are each associated with an identifier that differentiates the stock item and receptacle from other stock items and receptacles. The stock item or receptacle may be associated with a logistic unit configured to include attributes that describe features common to multiple different stock items or receptacles, wherein the association comprises matching the identifier of the stock item or receptacle with the logistic unit using an index associated with the logistic unit. The logistic unit may be processed based on the logistic unit attributes and independent of the identifier associated with the stock item or receptacle.

In a third general aspect, the method comprises a method for defining a logistic unit for planning and processing in logistic environment operations. A template database object may be accessed that is compatible with a modeled logistic environment process. A user assignment of defined attributes may be received for the accessed template object, wherein the defined attributes may describe a feature common to multiple different physical receptacles used to contain stock in a logistic environment or a feature common to contents of the receptacles. A logistic unit may be generated based on the template database object and the defined attributes, wherein the logistic unit may be assignable to a stock item to define how the stock item is to be handled in the modeled logistic environment process.

In selected embodiments, operations may further comprise associating a remainder stock item with a remainder logistic unit configured to include attributes that may describe features common to multiple different stock items or receptacles, and wherein the remainder logistic unit may represent a smaller quantity of stock that remains after the stock is associated with the logistic unit.

Advantages of the systems and techniques described herein may include any or all of the following: providing simplicity in logistic environment operations such as moving, packing or checking stock; providing a method by which to categorize stock using high-level, abstract descriptions, rather than stock details; improving logistic environment efficiency by providing logistic environment instructions (e.g., warehouse worker instructions) based on common attributes of stock; and using an abstract stock description entity to effect planning and execution operations in a logistics environment.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
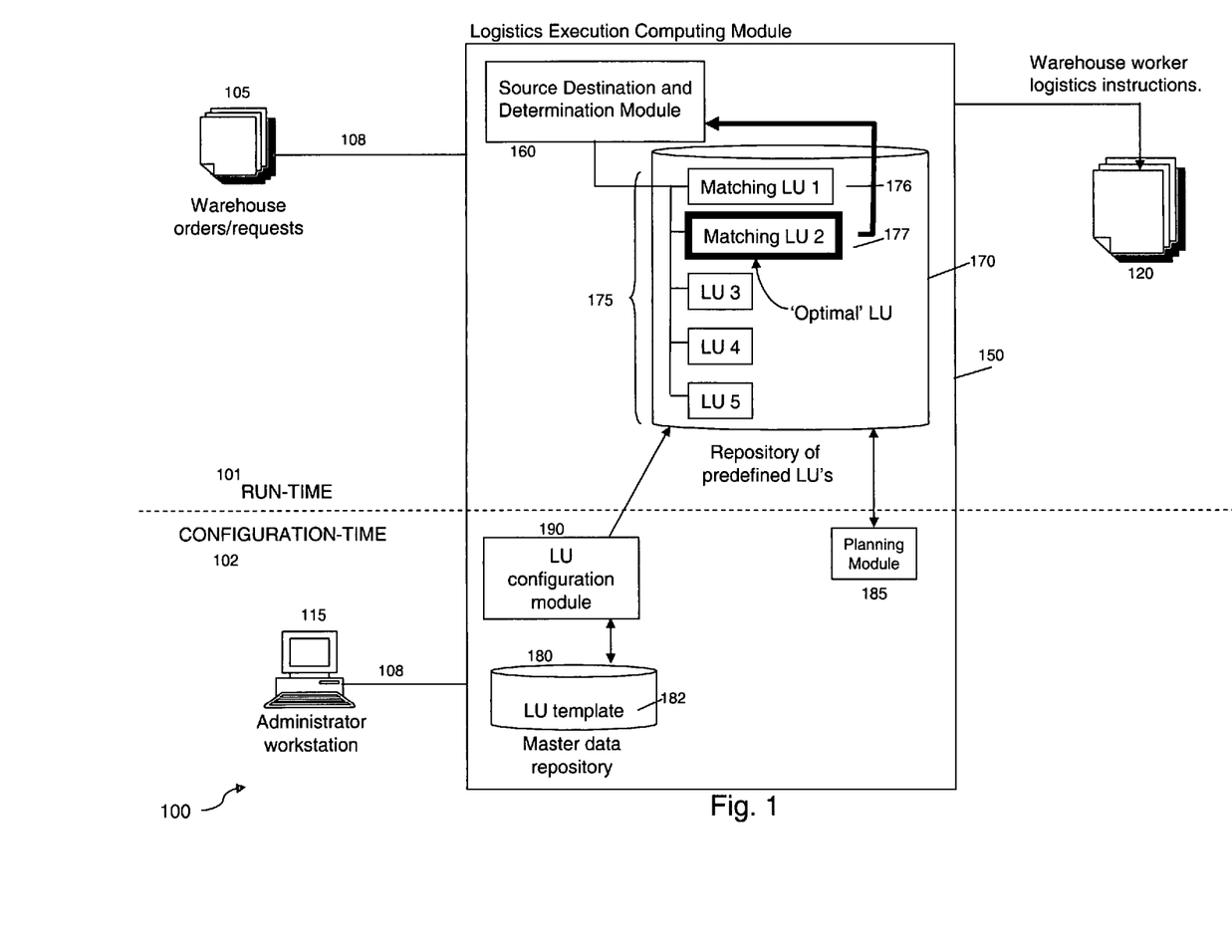
FIG. 1 is a schematic system diagram of a logistic environment.

The system 100 of FIG. 1 may be used to plan and execute operations on incoming and outgoing stock, by characterizing similar products and acting upon their attribute similarities rather than a unique stock identifier. This model 'abstraction' of the lowest-resolution terms describing the stock is referred to as a "Logistic Unit" (LU) and provides a logistic environment the ability to dynamically assign logistic resources based on this representation of stock item. Using LU's in concert with a logistics environment software solution, a LU need only contain certain characteristics, rather than specific identifiers, to effect operations for a given product. As will be discussed in detail, the defining characteristics of an LU are based on the lowest-resolution characteristics, or attributes, of common logistic entities, and may be associated with several warehouse stock operations, including: moving, packing, and checking. For example, move operations in a warehouse may be the same for all flammable items, or the same for all items on pallets, so the system may simply use the attributes contained in a "flammable" or "pallet" LU to effect the desired warehouse operation rather than associating operations with each separate product.

The system 100 is an exemplary logistic environment that may define and assign LU's as part of a software solution for logistics operations. The system 100 may include warehouse orders and requests 105, which may be move, pack, or check operations for a given product. For example, orders may be received by a computing system and may contain product identifiers, shipping and storage instructions, or other attributes, which may be used when matching to a LU containing similarly defined attributes. Likewise, a LU may be configured to link to specific products via product identifiers. For example, orders of "MILK" may be directly linked to a "MILK" LU. The system 100 contains a Logistics Execution Computing Module (LEX) 150, which may be responsible for executing commands relating to stock manipulation operations (move, pack, check). The results of the processed LEX module commands may be used to generate warehouse worker logistic instructions 120, for example, specific information on how a particular stock item is to be handled or moved.

FIG. 1 is split into two sections, a run-time mode 101 and a configuration mode 102, representing the run-time execution of commands by a computing system such as a networked enterprise server, and the configuration of the LU units 175 which may be accomplished through the use of an administrator workstation 115, respectively. The LU configuration-time 102 may be completed prior to run-time 101.

The LEX module 150 encompasses several features. A Source Destination and Determination module 160 may determine the source and destination locations of stock that is to be moved, stored, or both. A repository of pre-defined LU's 170 may contain definitions of individual LU's 175 that may have been configured by the administrator 115 and are available for matching against identifiers of the stock which is to be processed (move, pack or check), or may be used during planning operations to process stock according to the logistic activities (move, pack, check) associated with a particular LU. During configuration-time 102, the administrator 115 may access an LU configuration module 190, which may contain software execution instructions for configuring an LU from an LU template 182, which may be stored in a master data repository 180. The template LU 182 that may be used during the configuration process 102 may contain a collection of unassigned fields which may be assigned attributes by an administrator 115 (e.g. an unassigned "MAXIMUM WEIGHT" field may be filled with "100 LBS"). Other common unassigned fields can include attribute variations of weight, volume, or hazard classification, of physical units, and stock.

In one implementation, a user can assign the fields average, minimum, and maximum values for stock that the Logistic Area Database Object (LADO) will represent. For example, the user may input an average height for the LADO. Each individual stock that is represented in run-time can be larger or smaller than the LADO average height, but the average of the stock height for stock received corresponds with the LADO average height value. During run-time operation 101, a sequence of events may occur as follows. The logistic environment may receive an order or request 105 to perform an action (e.g., move, pack, check) on a particular stock item in the warehouse. The information from the order 105 may be received by the computing module 150, for example, either directly, e.g., through network connections, or through manual input from a computer workstation connected to a server through network connections. The enterprise platform may access the LEX module 150, which in turn may access the SDD module 160 and may perform matching of the warehouse order 105 to the most appropriate pre-defined LU 175 that may be contained in the LU repository 170. The SDD module may execute instructions using SDD primary rules that match a LU to the warehouse order 105; in the example in FIG. 1, two LU's 176, 177, have been selected according to the SDD primary rules. Using a secondary set of SDD 160 rules, the selection of LU's 176, 177 may be further refined to return a single, optimal matching LU 177. The refinement process may be based on a set of filtering rules executed by the SDD module 160. The SDD primary and secondary rules are discussed in further detail below. The SDD may select the source or destination location for the stock and may return the operation instructions based on rules using the location and the selected LU 177. Warehouse instructions may be generated based on the processing of the LU and may be transferred to a warehouse worker 120 with detailed logistic actions that the worker should take to effect the warehouse order or request 105.

In another embodiment, the LU may be used in planning operations as well as execution operations. A particular stock item may always be processed in the same manner when it is received at a loading dock within a logistics environment, for example. In this case, the administrator may use an LU for planning processes for this particular stock item, such that when the stock item arrives, the logistic processing functions that are to be performed on the stock are executed. In this manner, the administrator need not necessarily know what exactly the contents of a particular container are, only that the container needs to be handled in a certain way, and may plan logistics activities using the appropriate LU to ensure the stock is handled properly when it arrives. To utilize LU's in planning, an administrator 115 may access a planning module 185 which may have access to the repository of predefined LU's 170, and define certain processes for handling stock according to rules that may be defined in a particular LU 170. The administrator may then store the association as master data to be available during run-time operations for the execution of planning operations within the logistics environment.

During configuration time 102, an administrator may use a networked workstation 115 to access the enterprise solution to assemble the group of LU's 175 residing in the repository of pre-defined LU's 170. The administrator may build a new LU by determining the highest-level, or most abstract representation, of attributes representing stock. Descriptors of physical units (for example, "palette," "hazardous," "requires cold storage," "requires 20 cubic feet") may be selected by the administrator 115 to build an LU. In another embodiment, the LU fields are predefined and the administrator inputs values into the predefined fields. For example, the pre-defined LU 170 may be a software object definition that the administrator uses to generate, or instantiate a new LU. The instantiated LU can have pre-defined fields and methods that are inherited from the object definition, and the administrator may initialize the fields and methods with values and functions, respectively.

In another embodiment, an administrator may choose to directly link a product to a particular LU, through, for example, a product identifier such as a product ID number. Once an LU is configured to the administrator's specifications, the abstracted descriptions of stock may be saved as a LU 175 in a repository 170 where it may be used in the run-time process 101. The system 100 may generate specific warehouse worker instructions for move, pack, and/or check operations, based on the handling characteristics of an LU when an order is received for a particular stock. A possible benefit of using an LU is having one central logistic entity which reflects many physical units (i.e., products) in a warehouse. This may simplify design, maintenance, and operation of logistic environment software solutions.

Figure 2:
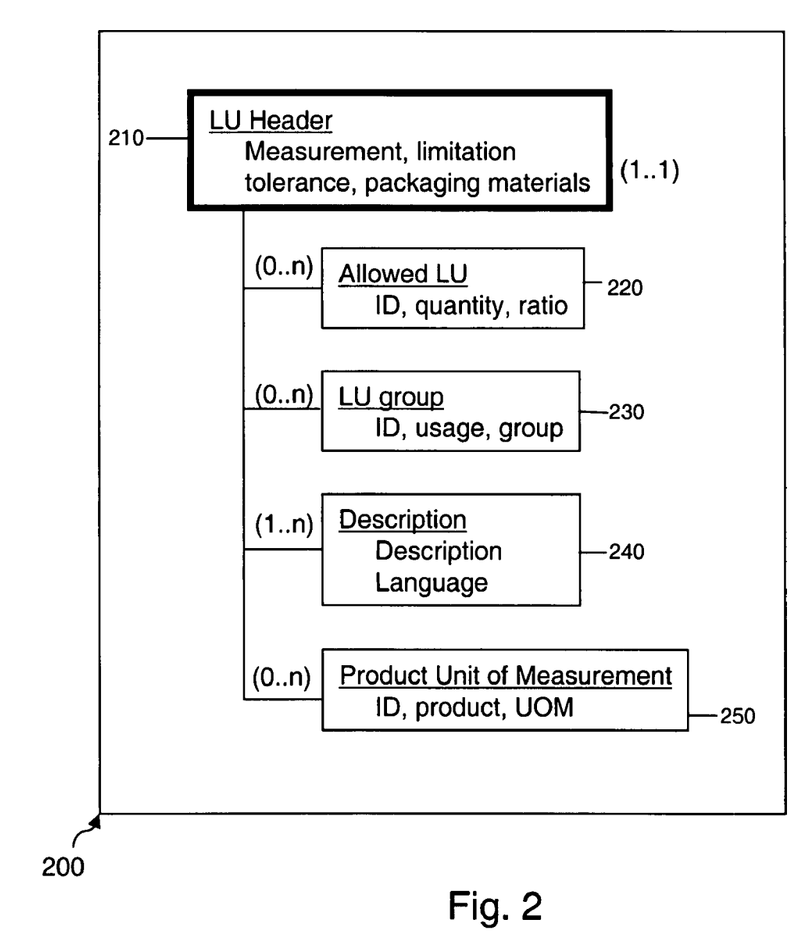
FIG. 2 is a block diagram of an exemplary LU definition.

FIG. 2 shows some basic elements that may be used in defining an exemplary LU. Three 'classifications' of LU's may exist: Basic, Standard, and Complex. The difference in these may depend on the amount of information entered into the definition and any inter-relationships that may exist between different LU's or other logistic components. The LU header 210 contains low-resolution product information fields, which, for example could include maximum or average 'measurement,' to describe the volume of a stock shipment; 'limitation tolerance,' i.e., the tolerance on the measurements involved; or 'packing materials,' which could simply be defined as "cardboard box." A Basic LU may only contain attributes that describe physical measurements of the receptacle that influence logistic operations. For example a Basic LU may utilize low resolution information such as that found in the LU header (e.g. "large box," "small case," or "pallet").

The Standard LU can include additional attributes, such as the material and quantity of the stock contained by the receptacle. For example, the LU may include a "material" field that is used to specify the material, such as cell phones, oranges, or books. A "quantity field" can specify the quantity that the LU represents, such as 50 units, or 100 lbs. Additional entries into dependent objects 205, such as the "Description" object 240, may be used to further define the Standard LU, and may contain additional information that the user may access to 'drill down' to associated materials. An example of a Standard LU may be "WINE BOX, 6 PC" to reflect that the LU is a box, contains wine, and is composed of 6 pieces (or units, such as bottles).

A Complex LU is one that may be output by a packing bill of materials, i.e., the constituents of a packing process may define the LU. The packing bill of materials can include specific packing requirements that a particular vendor requires, or an indicator that the stock to be packed is expensive and requires a certain type of packing material to adequately protect it. Once the stock is packed, it is associated with a LU that is processed based on attributes that can be independent of the packing requirements. For example, a Complex LU may be the result of a packing operation that packs carburetors for long-term storage. The packing bill of materials may dictate that the carburetors be oiled and wrapped in a moisture resistant material and sealed in a heavy-weight box. After the carburetors are boxed, the resulting packed stock may be treated as a heavy-weight box LU and processed independent of the packing requirements for the stock the box contains. The numbers in parentheses next to the dependent objects represent the number of dependent objects that may be associated with the LU.

Dependent objects are higher-resolution descriptions of stock that may be used in the definition of the LU or in grouping sets of LU's. "Allowed LU" 220 may be used during packing validation, and may include LU information that pertains to logistic processes that may be physically allowed or not, for example, whether a certain size wine box can fit into a another box, which is associated with its own LU. If the box is bigger than the wine box, the "Allowed LU" can indicate that the wine box may be packed into the bigger box. If the box is smaller, the "Allowed LU" can indicated that the wine box may not be packed into the smaller box."

An LU "group" 230 may be used to associate an LU with other LU's that are processed in a similar manner for certain logistic processes (e.g., moving, checking, or packing) This association can use an associating LU group ID, the usage of the LU, or a LU group name. An example may be a set of eight different cosmetic case types (different sizes for storing purposes) that each have a corresponding and different case LU, but all belong to an LU group "cases." Although, the individual LU's may be used to dictate how the cases are stored because each have different storage requirements, the association with the group LU "cases" dictates that all the cases are moved in the same manner, such as by forklift. Additionally, when a new LU is generated it may be added to an LU group, which is processed in a defined manner, instead of defining a method to handle each new LU that is created.

The administrator 115, when defining the LU group, may take into account all of the logistic activities and pick the most detailed attributes that appropriately describes the LU group, so that the stock items are processed correctly. For example, "Description" 240 may contain simple higher-resolution descriptions of the stock than may be present in the LU header 210, or may be based on specific language describing the stock. "Product Units of Measurement" 250 may describe the type of measurement description best suited for a particular stock. For example, "two liter bottle" may describe soft drinks from ten different vendors, but each soft drink stock item may be handled in the same manner. The level of descriptive LU detail entered during the configuration-time may ultimately determine the LU that is chosen to represent a particular stock item during run-time, however, the LU's may be as broad or narrow in scope as is necessary to satisfy the needs of the logistic environment.

Another LU embodiment may include an association with a "Remainder" LU. A Remainder LU may describe a LU for the remaining portions of, for example, a packing operation, where excess stock may be present after the pack. This could occur, for example, during the packing of wine cases onto a pallet prior to shipping to a customer, where the pack operation perhaps called for more wine cases than can fit onto the pallet. The Remainder LU may be accessed to determine how to handle excess cases. For example, the wine cases that cannot fit on the pallet may be placed on a half pallet, if the half pallet is the Remainder LU associated with the pallet. Additionally, the half pallet LU may have its own Remainder, which is used to pack the wine cases that remain after filling the half pallet.

Figure 3:
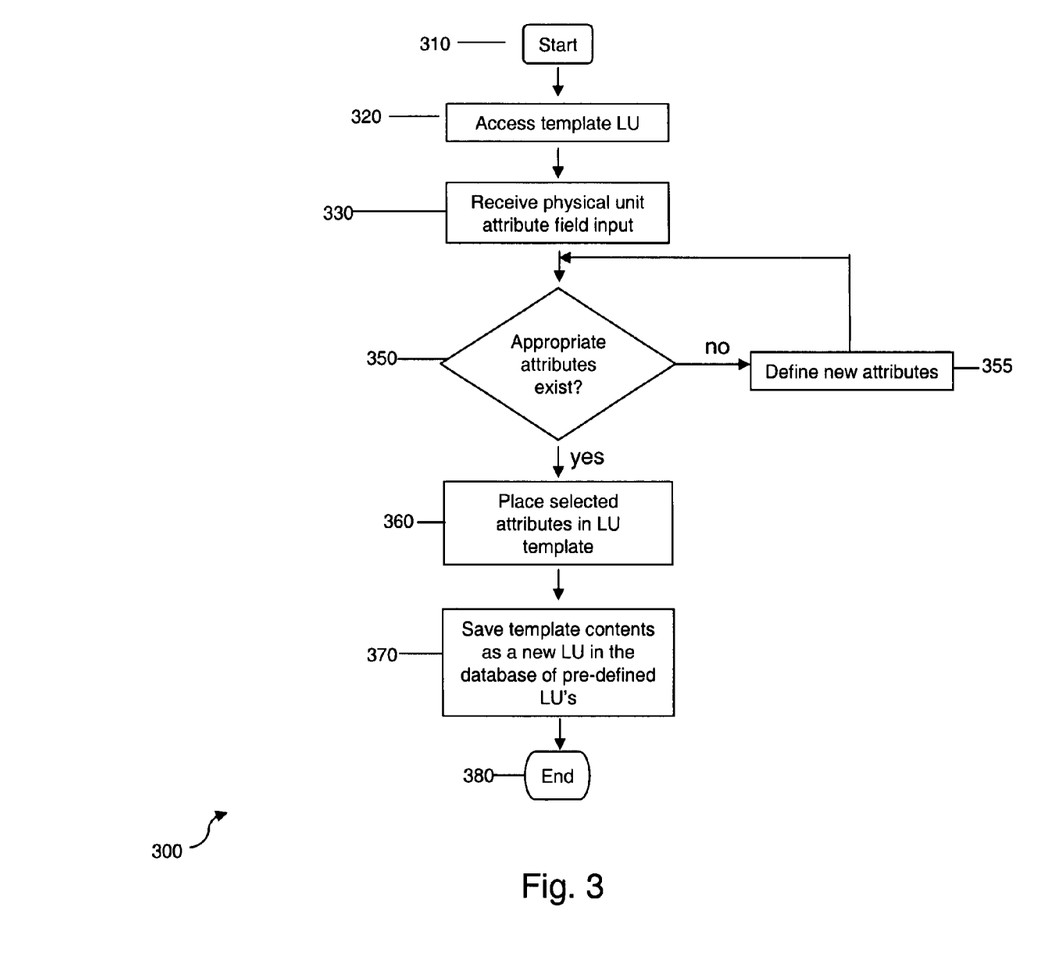
FIG. 3 is an exemplary flow chart of a method for configuring a LU.

A flow chart representing the steps that may be taken by an administrator when configuring an LU is presented in FIG. 3. The administrator may begin by accessing a template LU in step 320. The template LU may be a skeletal outline of the fields necessary to define an LU, but contains no entries for the fields. Accessing the template LU may be accomplished by means of a LU configuration module that contains execution instructions for accessing the LU template, receiving and storing user input, and saving the final configured LU in the LU repository 190. In step 330, the administrator may enter physical attributes to describe elements of the LU definition which may be incorporated into the new LU. If, as in step 350, appropriate field attributes are not available to the administrator, a module may be accessed, as in step 355, to allow the creation of new fields, which may be subsequently filled with description entries or values. In step 360, attributes appropriate to the description of stock may be added into the template LU to the limit necessary to fulfill the needs of the logistic environment. Step 370 allows the template contents to be saved as a new LU, containing the attributes to appropriately describe the stock, and the LU may be subsequently placed in the repository of predefined LU's.

Figure 4:
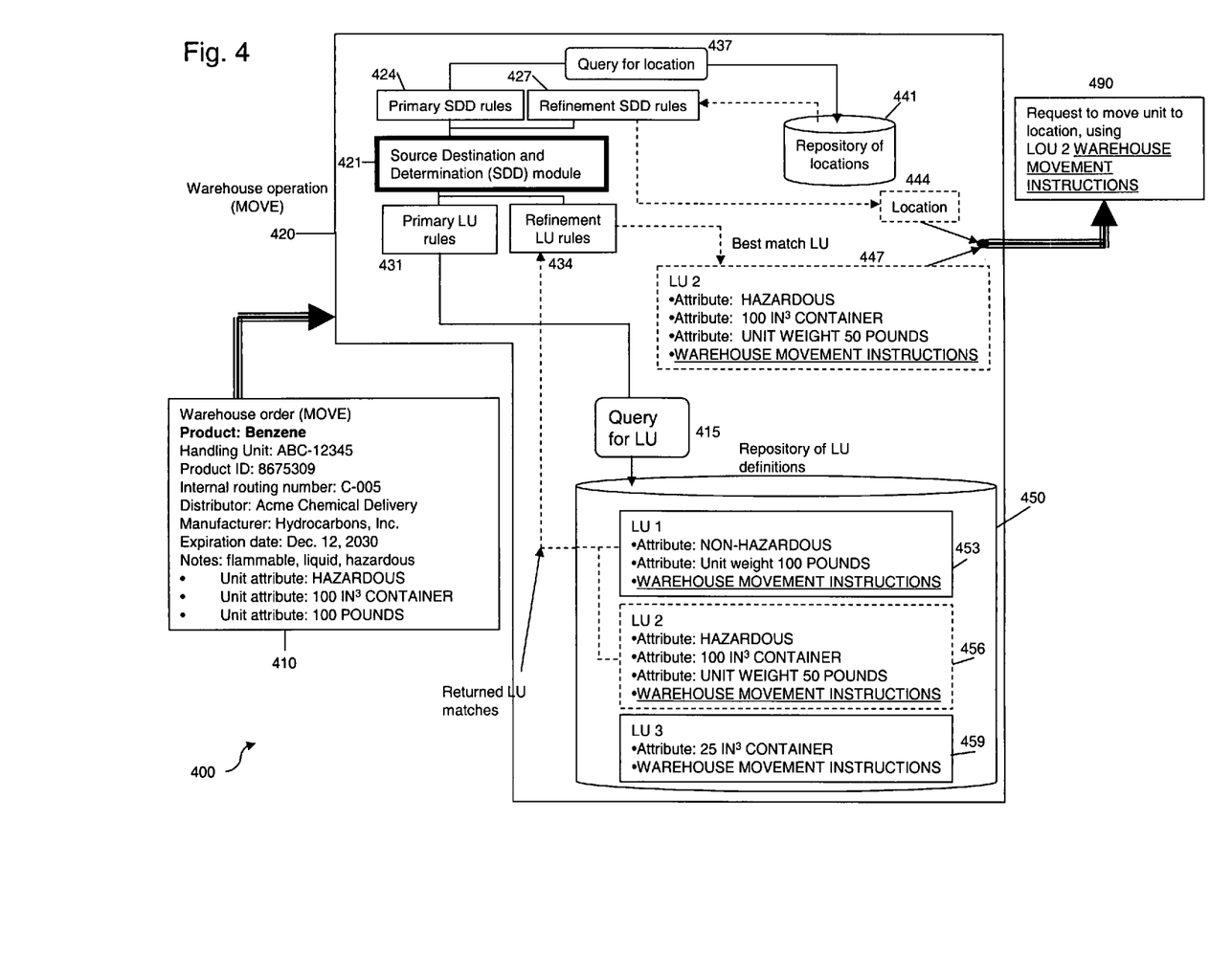
FIG. 4 is a more detailed block diagram of the system shown in FIG. 1.

Detailed interaction between a logistic environment order and the execution instructions of the software modules is depicted in FIG. 4, according to one implementation. The environment 400, which in this example represents a warehouse environment, may contain a specific warehouse order 410 for moving stock. A warehouse "move" operation 420 may include computing instructions, such as those that may be present in the Source Destination and Determination module 421, and the output of those executions are represented by a movement "request" 490 that may be transmitted to a warehouse worker. The SDD module 421 may contain primary 431 and secondary 434 LU rules, which may be software execution instructions that determine the best match between the stock and an LU, and, refinement methods which may select an optimal LU if more than one is chosen, respectively. The primary LU rules may contain execution instructions for querying a repository of predefined LU definitions 450 and receiving the results of that query. The SDD module also may include primary 424 and secondary 427 SDD rules, which, likewise can select the proper source and destination for the stock, and may filter the results if more than one location is chosen by the primary rules.

Dependent descriptions in the LU definition 205 serve to narrow the selection of the best representation of an LU for a given operation. For example, the dependent attribute "Product Unit of Measure" 250 (FIG. 2) may provide the details for a "MILK" LU, which in the most general sense describes all types of milk, from 1% fat to 5% cream. The "Product Unit of Measure" Standard LU description may include information on the various sizes of shipments commonly encountered in the logistics environment, from tanker trucks containing 1500 gallons of milk to individual 1 quart cardboard containers of milk. While the "MILK" LU may represent the broad classification of "milk" in this case, the handling requirements for the two containers are obviously quite different.

The process 400 may begin by the system receiving a move request 410 for incoming stock, which in this example is a shipment of benzene. The LEX platform may execute the SDD module 421 during operation to determine, for example, how the order 410 should be processed within the logistic environment, where the shipment should be stored, and what methods should be employed to effect the move operation. The SDD module 421 may utilize the primary LU rules 431 to query 415 a repository of LU definitions 450, for which, in this example, three LU's are shown 453, 456, and 459, each including some level of detail from a configuration step. The process of querying 415 the repository of LU definitions 450 may include software execution instructions that perform an analysis of the LU's for identifier attributes between the predefined LU's and the warehouse order 410 and selecting the matches. The system 400 in FIG. 4 is one example, where two predefined LU's 453 and 456 may have attributes that match the "HAZARDOUS," "100 POUNDS," or "100 IN$^3$ CONTAINER" attributes in the warehouse order 410. In this example, the results of the query return LU 1 and LU 2 to the SDD module 421. Since two LU's were returned, the refinement LU rules 434 may be employed to further select the better of the two LU's based on certain criteria. In this case, LU 2 was chosen, because "HAZARDOUS" may have claimed a higher priority over, for example, the "100 POUNDS" attribute that matched LU 1. It should be noted that execution of the SDD module 421 in conjunction with the use of LU's 450 performs the appropriate selection of stock movement methodology while bypassing a long list of extraneous information in the warehouse order 410, such as the product, distributor, and/or expiration date.

In another embodiment, the "Product" field of the warehouse order 410, which may serve as a unique product identifier ("benzene") may provide sufficient information such that a link to LU 2 may be directly established with this single identifying feature from the warehouse order 410. In cases such as this, the search for an appropriate LU from the repository of LU definitions 450 may not be necessary, and instead, the link is hard-coded between product "benzene" and LU 2 (447) during LU configuration-time.

Furthermore, more than one LU may be linked to the product. In this case, the SDD module may search for a favored LU based on characteristics of the product and attributes of the LU. For example, the incoming product may have a measurement value indicating that it is 700 lbs. Two LU's may be linked to the product. One is LU 1, which has a unit of measurement value indicating it can describes stock 0-800 lbs, and the second is LU 2, which has a unit of measurement value indicating that it describes stock 801-2000 lbs. The SDD module may select LU 1 because the stock's weight is within the LU's unit of measurement range.

Additionally, the LU may contain an association to a conversion factor that is used to convert the measurement values or the unit of measurement values. For example, if the incoming stock has a measurement value indicating it has a quantity of 20, the conversion factor may be used to convert the quantity into pounds if the unit of measurement is in pounds. In this example, the conversion factor could inform the system that a quantity of 1 weighs 50 pounds, thus the incoming stock weighs 1000 lbs. In one implementation, a generic conversion process may be included in the LU and the actual values used for the conversions can be stored in a product business object that is associated with the LU. The generic conversion process accesses the values for conversion from the product business object that corresponds to the product that needs conversion by the LU. The SDD module may also execute instructions via the primary SDD rules 424 to perform a query 437 for the source or destination of the order, by accessing a repository of locations 441 within the logistic environment, and returning the appropriate solution. Further refinement for the selection of source/location may be performed by refinement SDD rules 427 that will ultimately select one solution. The best-match source/location destination 444 and LU 447 may then be assimilated into a warehouse worker request 490, providing instructions on how to best accommodate the warehouse order 410. In one implementation, the request is sent to a human to implement the request by obtaining the necessary resource, such as a forklift, and performing the specified operation, such as moving the stock to an assigned location specified by the request.

LU's may be defined in logistic planning operations where the matching of LU's against the repository of pre-defined LU's may not be necessary. For example, an LU may be defined (or pre-chosen) in a bill of operations (BoO), such that the handling of stock for that BoO may be predetermined, and the LU may be passed as input into another business object, such as the SDD module or a routing module. This method may allow for flexibility in design considerations in enterprise logistics activities where stock items are handled in the same manner every time (for example in outbound orders where an LU may be determined by a packing operation), and does not require the matching functions described above to determine the best LU for a given product (as may be the case for an inbound stock order, where a routing procedure may need to be determined).

Figure 5:
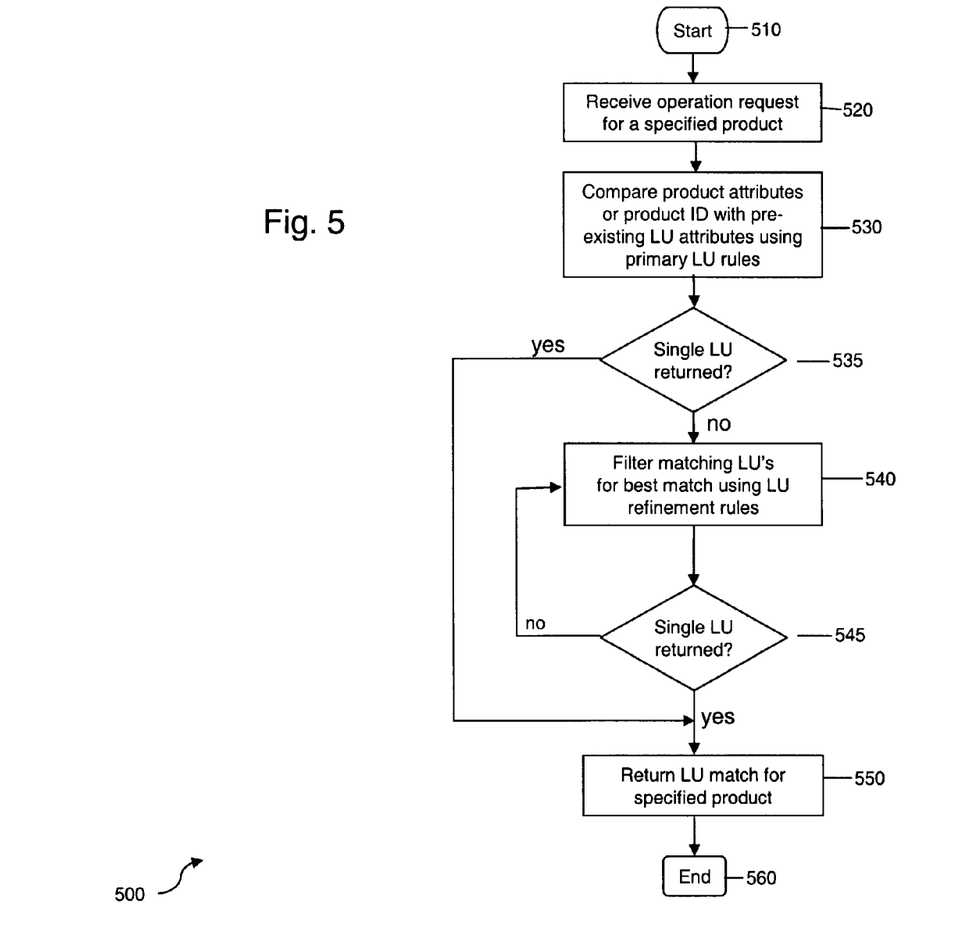
FIG. 5 is an exemplary flow chart of a method for assigning an LU at run-time.

FIG. 5 is a flow chart of an exemplary method 500 for assigning an LU to a product. The method may be implemented by the system 400 shown in FIG. 4. In step 520, the computing system receives a logistic environment operation request for a specific product. This request may be in the form of a move, pack or check operation, and the request may be entered manually, for example, by a manager, or be received through other methods of data transferal, such as a networked computer enterprise system. Through use of primary LU rules associated with a computing module, the attributes of the particular stock item may be compared with attributes that may be included in predefined LU's stored in a repository, as shown in step 530. An alternative embodiment may include direct matching of a product identifier to a specific LU. If, as in step 535, a single LU is returned from the query that satisfy the criteria of the controlling module, the LU match may be returned for the specified product, step 550. If, as in step 535 more than one LU match is returned from the query, a filtering module may be executed in step 540 to further refine the list of LU's so as to ultimately return a single LU to the controlling module. The controlling module may then incorporate or use the LU in the overall process of the logistics execution control module.

Figure 6:
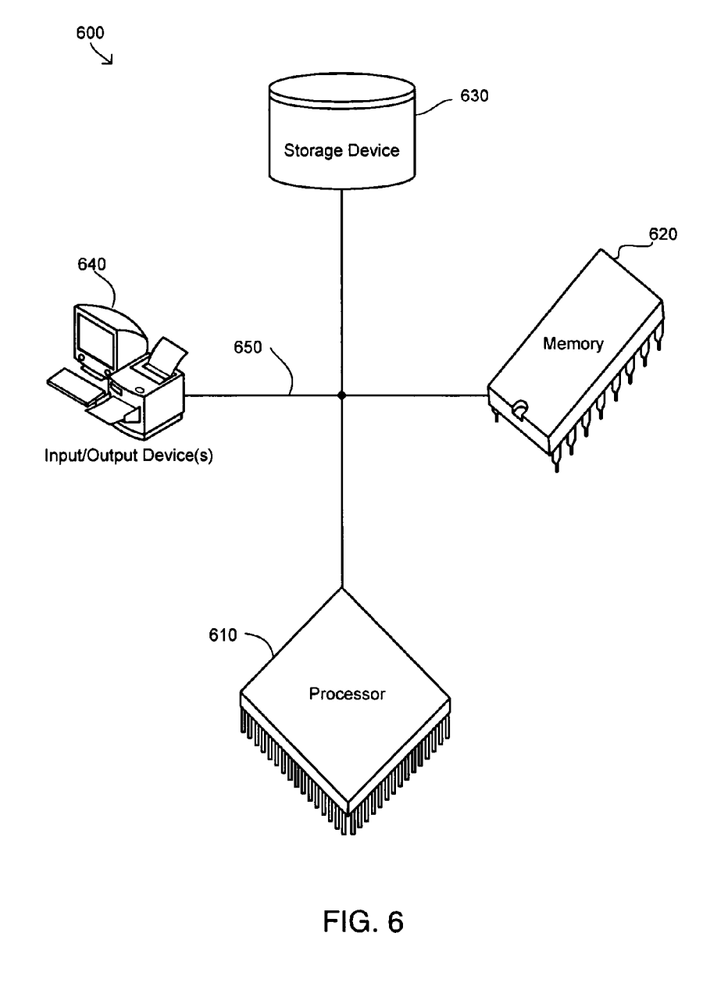
FIG. 6 is a schematic diagram of a general computing system.

FIG. 6 is a schematic diagram of a generic computer system 600 which can be used in the methods described above. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 700. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, additional descriptors of physical units (attributes) may be added to the master data repository if desired descriptors are not present. As an illustration, a suitable descriptor set for "eggs" may not exist in the administrator's master data repository 180. In this case, the administrator may use a data entry module to enter the term "fragile" into the master data, and may use other computing modules to enter software execution instructions on how to process the code for LU's with the "fragile" attribute. Further, logistic environments this system may include other systems, such as production warehouses, supermarkets, and transit planning applications. "Warehouse operations" as discussed above have centered on "move" operations, however, they may include "pack" and "quality checks" as well as "move." Accordingly, other embodiments are within the scope of the following claims.

What is claimed is:

1. A computer program product tangibly embodied in a computer-readable storage device, the computer program product including instructions that, when executed, perform operations for configuring a logistic unit software object for processing in a warehouse environment, the operations comprising:

accessing a template database object used to instantiate a class of logistical unit (LU) software objects that comprise software representations of units of stock or stock receptacles that are processed for logistical purposes by a software model of a warehouse environment in operations for the warehouse environment;

receiving a user assignment of attributes used to determine how to process the stock or stock receptacles within the warehouse environment, wherein the attributes include common characteristics that are shared among different stock or stock receptacles;

instantiating from the template database object a LU software object having the attributes, wherein the LU software object is capable of representing any of the different stock or stock receptacles that have the common characteristics;

designating the LU software object as representing particular stock or a particular stock receptacle having unshared individual characteristics that are not shared among the different stock or stock receptacles;

determining in a first operation by the software model how the particular stock or the particular stock receptacle represented by the LU software object is processed within the warehouse environment based on the common characteristics and not the individual characteristics of the particular stock or the particular stock receptacle represented by the LU software object; and outputting an indication of how to process the particular stock or the particular stock receptacle based on the determination.

2. The computer program product of claim 1, wherein the operations further comprise creating an index configured to associate the receptacles or the stock with the LU software object.

3. A computer program product tangibly embodied in a computer-readable storage device, the computer program product including instructions that, when executed, perform operations for associating logistic units with receptacles or stock items, the operations comprising:

receiving an electronic document that specifies a logistic operation to be performed on a particular stock item or a particular receptacle used to contain stock items, wherein the particular stock item or particular receptacle is associated with an individual identifier that differentiates the particular stock item or particular receptacle from other stock items and receptacles;

accessing a software model of a warehouse environment that digitally represents different types of stock items or receptacles in the warehouse environment with logistic unit (LU) software objects, wherein a LU software object has an attribute comprising a common characteristic that is shared among at least a portion of the different types of stock items or receptacles;

selecting the LU software object to represent the particular stock item or the particular receptacle based on a comparison of one or more characteristics of the particular stock item or the particular receptacle with the common characteristic of the LU software object;

representing the particular stock item or the particular receptacle in the software model using the selected LU software object;

determining, by the software model, how to perform the logistic operation for the particular stock item or the particular receptacle based on the common characteristic of the LU software object without using the individual identifier associated with the particular stock item or particular receptacle; and transmitting an indication of how to perform the logistic operation for the particular stock item or the particular receptacle based on the determination.

4. The computer program product of claim 3, wherein the logistic operation comprises assigning a location to store the particular stock item or the particular receptacle.

5. The computer program product of claim 4, wherein transmitting the indication of how to perform the logistical operation comprises transmitting the location and the individual identifier for the particular stock item or the particular receptacle to a computing device for display as instructions for a worker to move the stock.

6. The computer program product of claim 4, wherein transmitting the indication of how to perform the logistical operation comprises transmitting the location and the individual identifier for the particular stock item or the particular receptacle to a software module that uses the indication to plan where future stock should be placed.

7. The computer program product of claim 3, wherein the logistic operation comprises checking the quality of the particular stock item or the particular receptacle 8. The computer program product of claim 3, wherein the logistic operation comprises packing the particular stock item or the particular receptacle.

9. The computer program product of claim 3, wherein the operations further comprise generating instructions to a worker in the warehouse environment to initiate the logistic operation based on the transmitted indication 10. The computer program product of claim 3, wherein selecting LU software object further comprises filtering the LU software objects using refinement rules if more than one LU software object has a common characteristic that matches the one or more characteristics of the particular stock item or the particular receptacle.

11. The computer program product of claim 3, wherein the attribute of the LU software object comprises retrieval or placement requirements, storage requirements, packing requirements, handling requirements, or a combination thereof.

12. The computer program product of claim 3, wherein the operations further comprise grouping LU software objects that share common attributes into a logistic unit group software object.

13. The computer program product of claim 12, wherein the operations further comprise determining, by the software model, how to process particular stock or particular receptacles based on the shared common attributes of the logistic unit group software object.

14. The computer program product of claim 13, wherein the operations further comprise associating a remainder stock item with a remainder LU software object configured to include one or more attributes that describe features common to multiple different stock items or receptacles, wherein the remainder LU software object represents a smaller quantity of stock that remains after the smaller quantity of stock is associated with the LU software object.

15. The computer program product of claim 3, wherein selecting the LU software object further comprises determining one LU software object is favored over other LU software objects in the selection if a value of the one or more characteristics of the particular stock item or the particular receptacle is closest in value to a value associated with the one LU software object.

16. The computer program product of claim 15, wherein the operations further comprise performing a measurement conversion on the value of the one or more characteristics of the particular stock item or the particular receptacle using a conversion factor associated with the LU software object so that the values of the LU software object and the one or more characteristics of the particular stock item or the particular receptacle can be compared.

17. A method for configuring a logistic unit for planning and processing in a logistic environment, comprising:

accessing a template database object used to instantiate a class of logistical unit (LU) software objects that comprise software representations of units of stock or stock receptacles that are processed for logistical purposes by a software model of a warehouse environment in operations for the warehouse environment;

receiving a user assignment of defined attributes used to determine how to process the stock or stock receptacles within the warehouse environment wherein the attributes include common characteristics that are shared among different stock or stock receptacles;

instantiating from the template database object a LU software object having the attributes, wherein the LU software object is capable of representing any of the different stock or stock receptacles that have the common characteristics;

designating the LU software object as representing particular stock or a particular stock receptacle having unshared individual characteristics that are not shared among the different stock or stock receptacles;

determining in a first operation by the software model how the particular stock or the particular stock receptacle represented by the LU software object is processed within the warehouse environment based on the common characteristics and not the individual characteristics of the particular stock or the particular stock receptacle represented by the LU software object; and outputting an indication of how to process the particular stock or the particular stock receptacle based on the determination.

* * * * *